United States Patent
Chan

(10) Patent No.: US 9,841,645 B2
(45) Date of Patent: Dec. 12, 2017

(54) DISPLAY DEVICE

(71) Applicant: Himax Display, Inc., Tainan (TW)

(72) Inventor: Shu-Chuan Chan, Tainan (TW)

(73) Assignee: Himax Display, Inc., Tainan (TW)

( * ) Notice: Subject to any disclaimer, the term of this patent is extended or adjusted under 35 U.S.C. 154(b) by 112 days.

(21) Appl. No.: 14/676,835

(22) Filed: Apr. 2, 2015

(65) Prior Publication Data

US 2016/0291381 A1 Oct. 6, 2016

(51) Int. Cl.
*G02F 1/1345* (2006.01)
*G02F 1/1335* (2006.01)

(52) U.S. Cl.
CPC .... *G02F 1/13452* (2013.01); *G02F 1/133615* (2013.01); *G02F 2001/133616* (2013.01)

(58) Field of Classification Search
CPC ............ G02F 1/13458; G02F 1/13452; G02F 1/133615; G02F 2001/133616
USPC .................................................. 349/149–152
See application file for complete search history.

(56) References Cited

U.S. PATENT DOCUMENTS

| | | | |
|---|---|---|---|
| 6,323,919 | B1 | 11/2001 | Yang |
| 8,434,926 | B2 | 5/2013 | Ryu |
| 2002/0047953 | A1 | 4/2002 | Endo |
| 2008/0204622 | A1 | 8/2008 | You |
| 2011/0109841 | A1 | 5/2011 | Umekawa |
| 2011/0280046 | A1* | 11/2011 | Tsai ..................... G02B 6/0021 362/613 |
| 2012/0170317 | A1* | 7/2012 | Tsai ..................... G02B 6/0021 362/621 |

FOREIGN PATENT DOCUMENTS

| | | | | |
|---|---|---|---|---|
| EP | 2 549 177 A2 | 1/2013 | | |
| JP | H09213115 A | 8/1997 | | |
| JP | H09237514 A | 9/1997 | | |
| JP | H10334718 A | 12/1998 | | |
| JP | 2000111900 A | 4/2000 | | |
| JP | 200272915 A | 3/2002 | | |
| JP | 200357650 A | 2/2003 | | |
| JP | 2004309774 A | 11/2004 | | |
| JP | 2005-038776 | * | 2/2005 | ............... F21V 8/00 |
| JP | 200538776 A | 2/2005 | | |
| JP | 2006252789 A | 9/2006 | | |
| JP | 2006276600 A | 10/2006 | | |
| JP | 2007220369 A | 8/2007 | | |
| JP | 20094197 A | 1/2009 | | |
| JP | 2014154732 A | 8/2014 | | |
| KR | 1020100001566 A | 1/2010 | | |
| TW | I256501 | 6/2006 | | |

(Continued)

*Primary Examiner* — Charles Chang
(74) *Attorney, Agent, or Firm* — Winston Hsu

(57) ABSTRACT

A display device includes a display panel, a circuit board, a light guide structure and two paste materials. The circuit board is disposed on the display panel. The light guide structure is disposed on the display panel. The light guide structure has a bottom surface and a peripheral surface, wherein the bottom surface is oriented toward the display panel and the peripheral surface is adjacent to the bottom surface. Two plating pads are formed on the bottom surface. Two first recesses are formed on the peripheral surface and corresponding to the two plating pads. The two paste materials are formed between the two plating pads and the circuit board.

8 Claims, 5 Drawing Sheets

(56) References Cited

FOREIGN PATENT DOCUMENTS

| TW | 200711089 | 3/2007 |
|---|---|---|
| WO | 2011080948 A1 | 7/2011 |
| WO | 2012081395 A1 | 6/2012 |

* cited by examiner

DISPLAY DEVICE

BACKGROUND OF THE INVENTION

1. Field of the Invention

The invention relates to a display device and, more particularly, to a display device capable of preventing image sticking from occurring in a display panel.

2. Description of the Prior Art

Referring to FIG. 1, FIG. 1 is a perspective view illustrating a display device 1 of the prior art. As shown in FIG. 1, the display device 1 comprises a display panel 10, a circuit board 12, a light guide structure 14 and two paste materials 16. The circuit board 12 and the light guide structure 14 are disposed on the display panel 10. In general, there is a light source (not shown) disposed in the light guide structure 14, so as to form a front light module. The two paste materials are formed between the circuit board 12 and the light guide structure 14, so as to electrically connect the circuit board 12 and the light source. When the display device 1 is operated in an environment with high temperature and high humidity for a long span of time (e.g. 240 hours), the paste materials 16 may deform due to thermal expansion and contraction, such that image sticking may occur in the display panel.

SUMMARY OF THE INVENTION

The invention provides a display device capable of preventing image sticking from occurring in a display panel, so as to solve the aforesaid problems.

According to an embodiment of the invention, a display device comprises a display panel, a circuit board, a light guide structure and two paste materials. The circuit board is disposed on the display panel. The light guide structure is disposed on the display panel. The light guide structure has a bottom surface and a peripheral surface, wherein the bottom surface is oriented toward the display panel and the peripheral surface is adjacent to the bottom surface. Two plating pads are formed on the bottom surface. Two first recesses are formed on the peripheral surface and corresponding to the two plating pads. The two paste materials are formed between the two plating pads and the circuit board.

As mentioned in the above, the invention forms the first recesses on the peripheral surface and corresponding to the plating pads. When the paste materials deform due to thermal expansion and contraction, the first recesses function as a spring, such that the plating pads can be pulled down as the paste materials contract and the plating pads can be lifted up as the paste materials expand. Accordingly, stress concentration is reduced in the paste materials and image sticking is prevented from occurring in the display panel.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
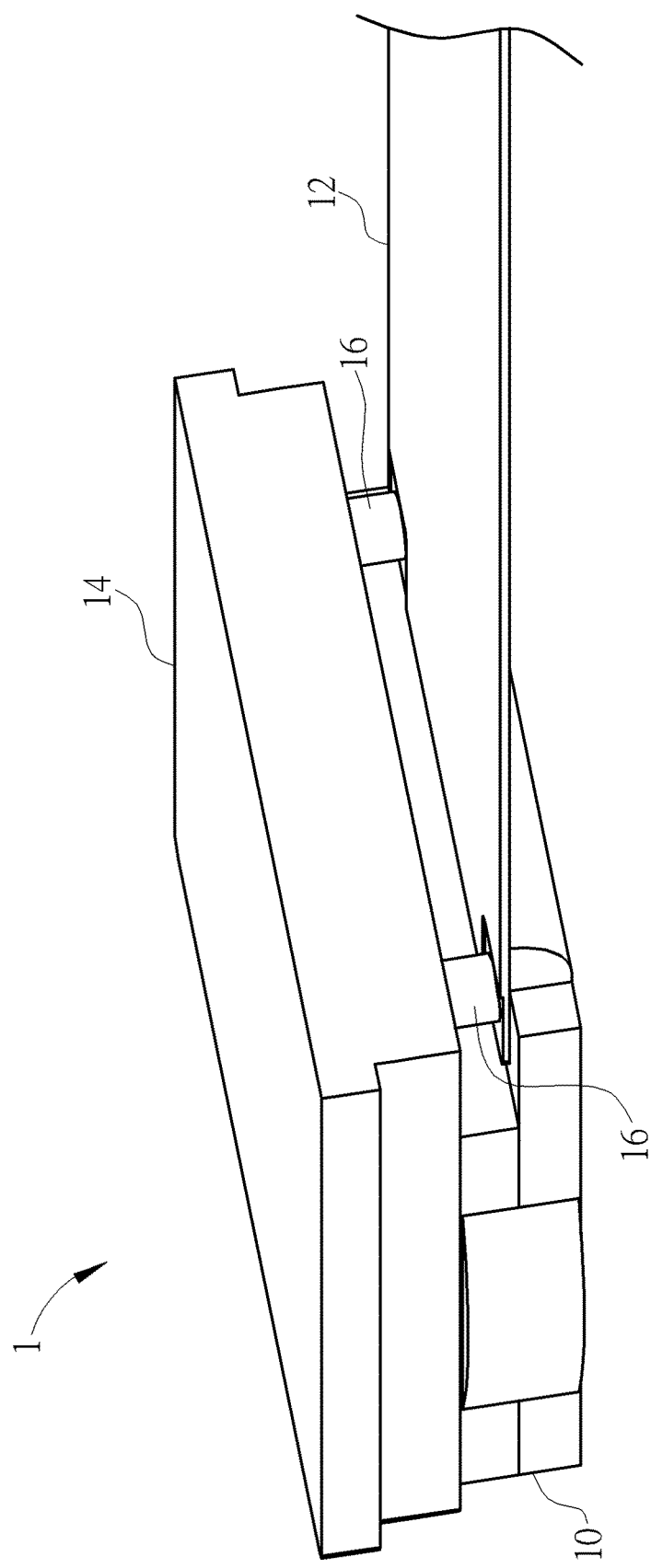
FIG. 1 is a perspective view illustrating a display device of the prior art.
Figure 2:
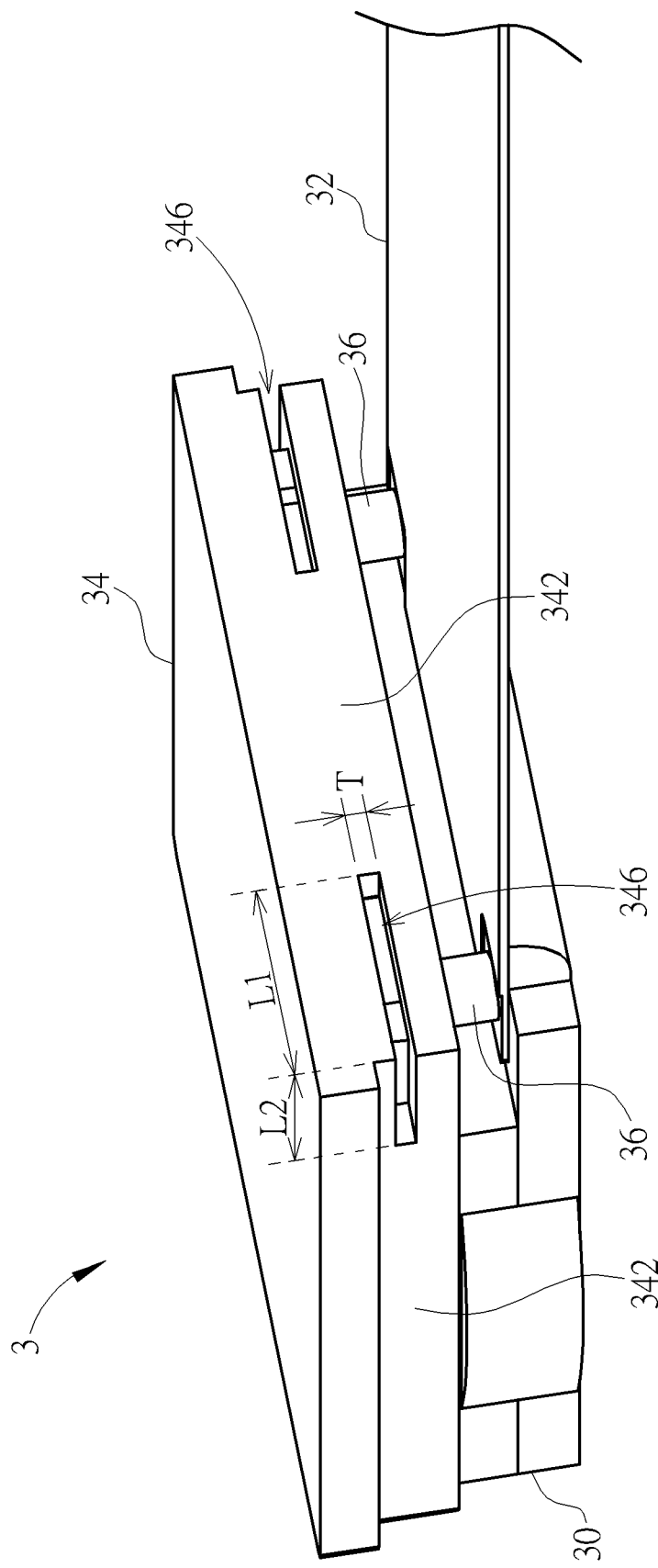
FIG. 2 is a perspective view illustrating a display device according to an embodiment of the invention.
Figure 3:
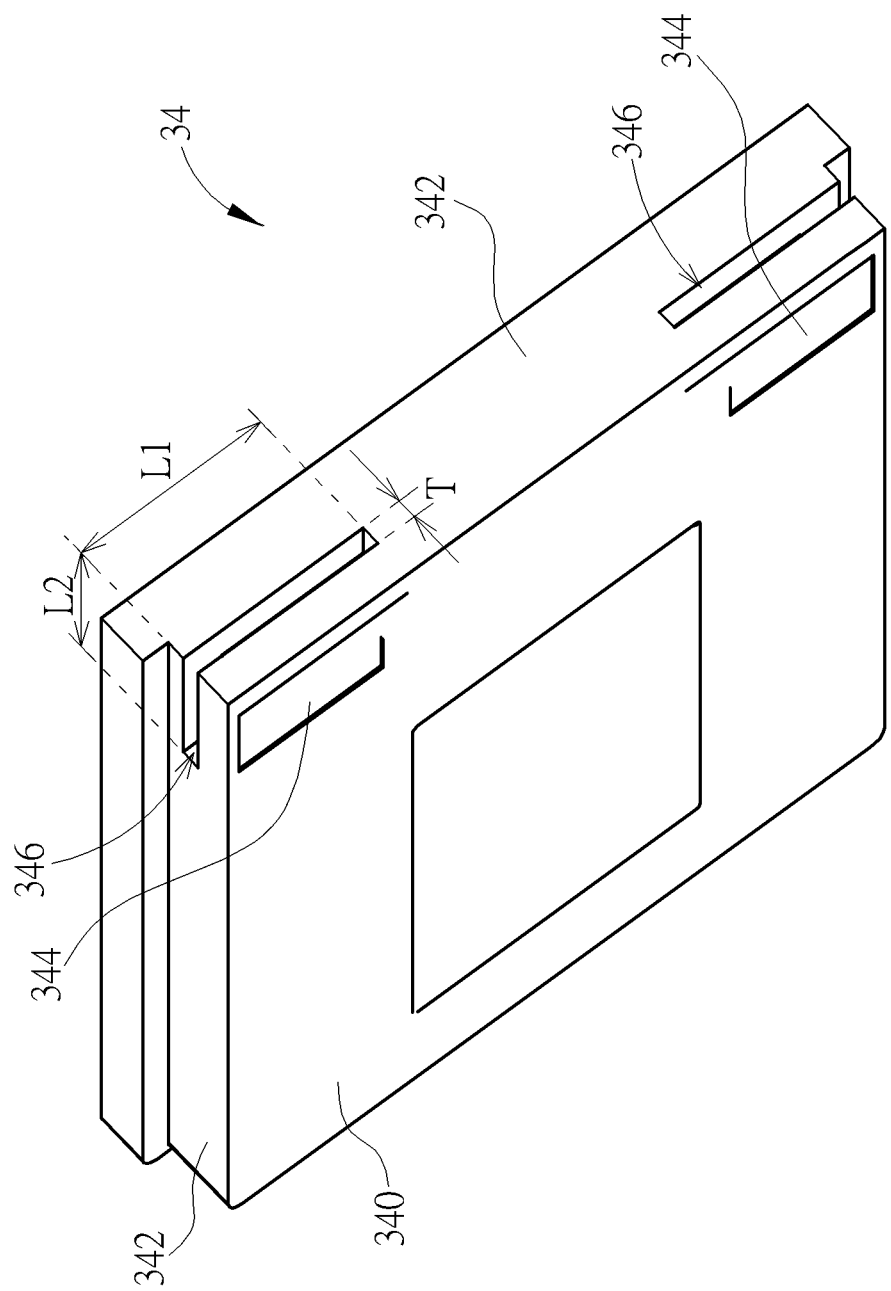
FIG. 3 is a perspective view illustrating the light guide structure shown in FIG. 2 from another viewing angle.

Referring to FIGS. 2 and 3, FIG. 2 is a perspective view illustrating a display device 3 according to an embodiment of the invention, and FIG. 3 is a perspective view illustrating the light guide structure 34 shown in FIG. 2 from another viewing angle.

As shown in FIG. 2, the display device 3 comprises a display panel 30, a circuit board 32, a light guide structure 34 and two paste materials 36. In this embodiment, the display panel 30 may be a liquid crystal display (LCD) panel or other display panels, the circuit board 32 may be a flexible printed circuit board (FPC) or other circuit boards, and the paste materials 36 may be silver pastes or other paste materials. The light guide structure 34 may be made of, but not limited to, liquid crystal polymer (LCP).

The circuit board 32 and the light guide structure 34 are disposed on the display panel 30. In general, there is a light source (e.g. light emitting diode, not shown) disposed in the light guide structure 34, so as to form a front light module. The light guide structure 34 has a bottom surface 340 and a peripheral surface 342, wherein the bottom surface 340 is oriented toward the display panel 30 as the light guide structure 34 is disposed on the display panel 30, and the peripheral surface 342 is adjacent to the bottom surface 340. As shown in FIG. 3, two plating pads 344 are formed on the bottom surface 340. Furthermore, two first recesses 346 are formed on the peripheral surface 342 and corresponding to the two plating pads 344. The two paste materials 36 are formed between the two plating pads 344 and the circuit board 32, so as to electrically connect the circuit board 32 and the light source (not shown) within the light guide structure 34.

When the paste materials 36 deform due to thermal expansion and contraction, the first recesses 346 function as a spring, such that the plating pads 344 can be pulled down as the paste materials 36 contract and the plating pads 344 can be lifted up as the paste materials 36 expand. Accordingly, stress concentration is reduced in the paste materials 36 and image sticking is prevented from occurring in the display panel 30.

Preferably, a thickness T of the first recess 346 in a direction perpendicular to the bottom surface 340 may be larger than or equal to 0.1 mm, and a length L1, L2 of the first recess 346 in a direction parallel to the bottom surface 340 may exceed the plating pad 344, such that stress concentration may be reduced in the paste materials 36 more effectively and image sticking may be prevented from occurring in the display panel 30 more effectively.

In this embodiment, the two first recesses 346 may be formed to penetrate or not penetrate through an inner wall of the light guide structure 34 according to practical applications.

Figure 4:
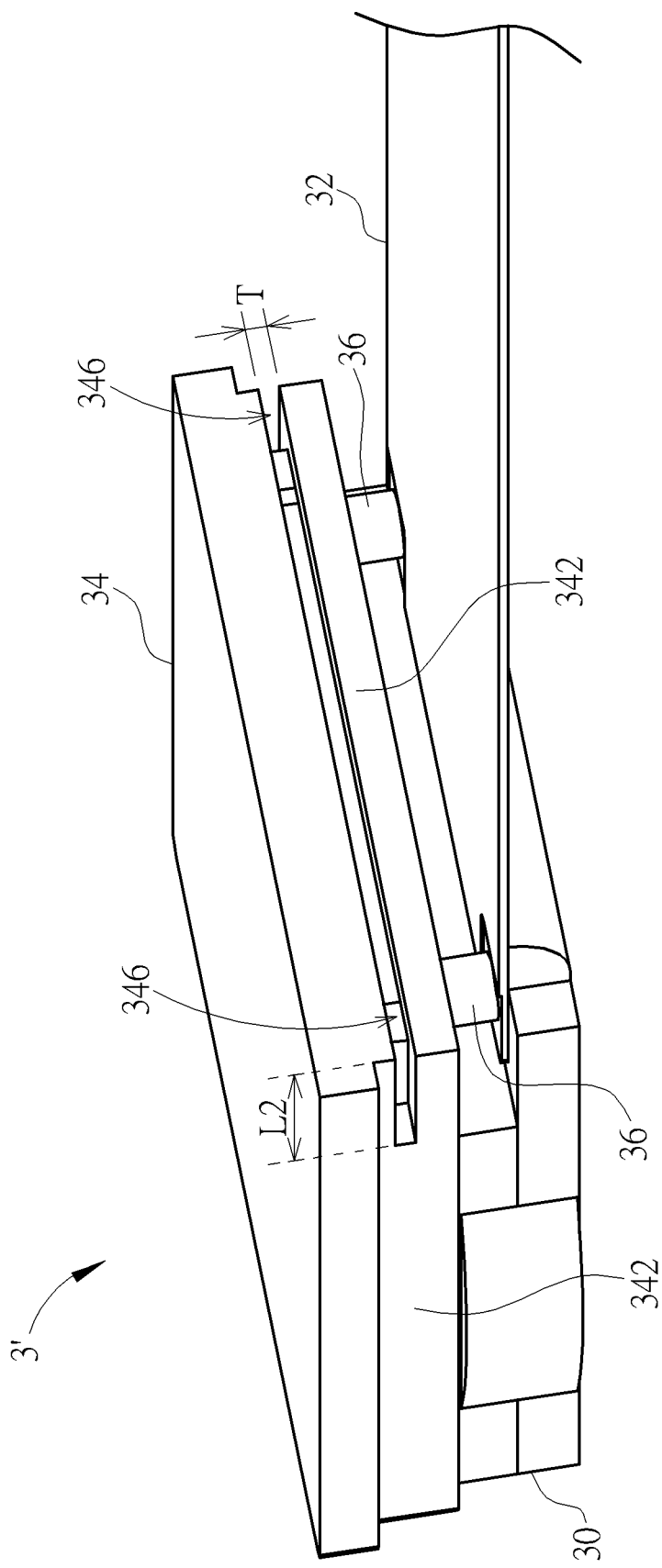
FIG. 4 is a perspective view illustrating a display device according to another embodiment of the invention.

Referring to FIG. 4 along with FIG. 2, FIG. 4 is a perspective view illustrating a display device 3' according to another embodiment of the invention. The difference between the display device 3' and the aforesaid display device 3 is that the two first recesses 346 of the display device 3' are formed to communicate with each other, so as to form a single recess, as shown in FIG. 4. In other words, the invention can form a single recess on the peripheral surface 342 to achieve the same function as the aforesaid display device 3.

Figure 5:
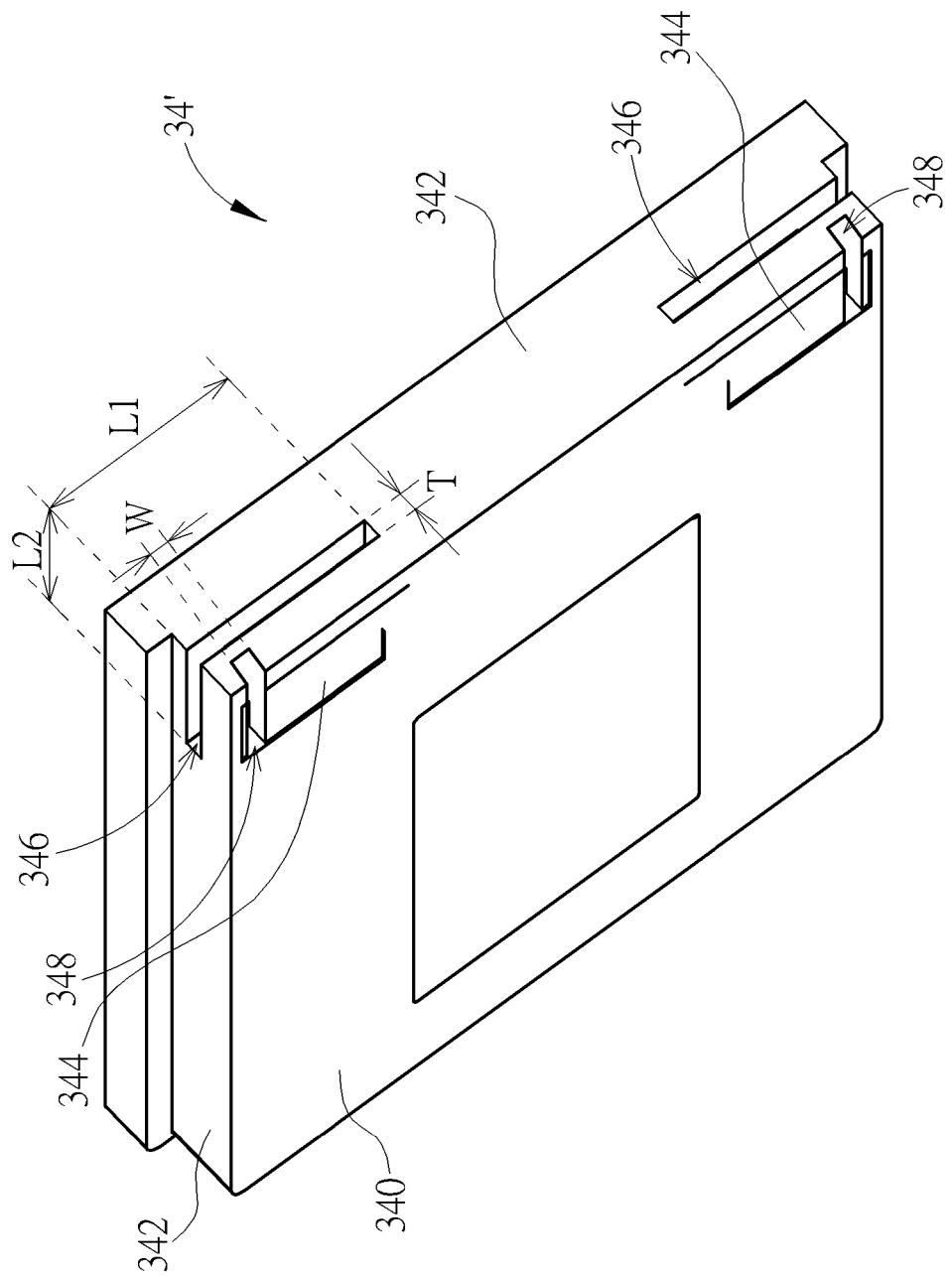
FIG. 5 is a perspective view illustrating a light guide structure according to another embodiment of the invention.

Referring to FIG. 5 along with FIG. 3, FIG. 5 is a perspective view illustrating a light guide structure 34' according to another embodiment of the invention. The difference between the light guide structure 34' and the aforesaid light guide structure 34 is that the light guide structure 34' further comprises two second recesses 348 formed on the bottom surface 340 and adjacent to the two plating pads 344, as shown in FIG. 5. When the light guide structure 34 shown in FIG. 2 is replaced by the light guide structure 34' shown in FIG. 5, stress concentration may be reduced in the paste materials 36 more effectively and image sticking may be prevented from occurring in the display panel 30 more effectively.

Preferably, a width W of the second recess 348 in a direction parallel to the bottom surface 340 is larger than or equal to 0.1 mm, such that stress concentration may be reduced in the paste materials 36 more effectively and image sticking may be prevented from occurring in the display panel 30 more effectively.

In this embodiment, the second recess 348 may be formed to communicate or not communicate with the first recess 346 according to practical applications.

As mentioned in the above, the invention forms the first recesses on the peripheral surface and corresponding to the plating pads. When the paste materials deform due to thermal expansion and contraction, the first recesses function as a spring, such that the plating pads can be pulled down as the paste materials contract and the plating pads can be lifted up as the paste materials expand. Accordingly, stress concentration is reduced in the paste materials and image sticking is prevented from occurring in the display panel. Furthermore, the invention may form the second recesses on the bottom surface and adjacent to the plating pads, such that stress concentration may be reduced in the paste materials more effectively and image sticking may be prevented from occurring in the display panel more effectively.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A display device comprising:
   a display panel;
   a circuit board disposed on the display panel;
   a light guide structure disposed on the display panel, the light guide structure having a bottom surface and a peripheral surface, the bottom surface being oriented toward the display panel, the peripheral surface being adjacent to the bottom surface, two plating pads being formed on the bottom surface, two first recesses being formed on the peripheral surface and corresponding to the two plating pads; and
   two paste materials formed between the two plating pads and the circuit board.

2. The display device of claim 1, wherein a thickness of the first recess in a direction perpendicular to the bottom surface is larger than or equal to 0.1 mm.

3. The display device of claim 1, wherein a length of the first recess in a direction parallel to the bottom surface exceeds the plating pad.

4. The display device of claim 1, wherein the two first recesses are formed to penetrate or not penetrate through an inner wall of the light guide structure.

5. The display device of claim 1, wherein the two first recesses are formed to communicate with each other, so as to form a single recess.

6. The display device of claim 1, wherein two second recesses are formed on the bottom surface and adjacent to the two plating pads.

7. The display device of claim 6, wherein a width of the second recess in a direction parallel to the bottom surface is larger than or equal to 0.1 mm.

8. The display device of claim 6, wherein the second recess is formed to communicate or not communicate with the first recess.

* * * * *